(12) United States Patent
Care et al.

(10) Patent No.: US 6,378,293 B1
(45) Date of Patent: Apr. 30, 2002

(54) GAS TURBINE ENGINE BEARING ARRANGEMENT

(75) Inventors: Ian C D Care; Arnold C Newton, both of Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/506,570

(22) Filed: Feb. 18, 2000

(30) Foreign Application Priority Data

Feb. 25, 1999 (GB) ............................................. 9904221

(51) Int. Cl.[7] ................................................. F02K 3/06
(52) U.S. Cl. ..................................... 60/226.1; 310/90.5
(58) Field of Search .......................... 60/226.1; 310/90.5

(56) References Cited

U.S. PATENT DOCUMENTS

| | | | | |
|---|---|---|---|---|
| 5,345,127 A | * | 9/1994 | New ........................... | 310/90.5 |
| 5,481,145 A | * | 1/1996 | Canders et al. ............. | 310/90.5 |
| 5,749,700 A | * | 5/1998 | Henry et al. ................ | 310/90.5 |
| 5,867,979 A | * | 2/1999 | Newton et al. ............. | 60/226.1 |
| 5,977,677 A | * | 11/1999 | Henry et al. ................ | 310/90.5 |

FOREIGN PATENT DOCUMENTS

| | | |
|---|---|---|
| EP | 0892186 A2 A | 1/1999 |
| GB | 2258699 A | 2/1993 |
| GB | 2298459 A | 9/1996 |

* cited by examiner

Primary Examiner—Michael Koczo
(74) Attorney, Agent, or Firm—W. Warren Taltavull; Manelli Denison & Selter PLLC

(57) ABSTRACT

A gas turbine engine (10) is provided with a plurality of shafts (18, 19, 20) interconnecting its compressor portions (11, 12, 13) with its turbine portions (15, 16, 17). Each shaft (18, 19, 20) is supported in the hotter part of the engine by electromagnetic bearings (26, 28, 32) and by rolling element bearings (24, 27, 29, 31, 33) in the remainder of the engine (10). The arrangement provides a simplified liquid lubrication system for the rolling element bearings (24, 27, 29, 31, 33) which reduces the likelihood of lubricant thermal degradation of the lubricant.

8 Claims, 3 Drawing Sheets

GAS TURBINE ENGINE BEARING ARRANGEMENT

FIELD OF THE INVENTION

This invention relates to a gas turbine engine and is particularly concerned with a bearing arrangement for supporting the main shaft or shafts of such an engine.

BACKGROUND OF THE INVENTION

Gas turbine engines typically comprise gas compression and expansion sections that are spaced apart by a combustion section. Usually, the gas compression section comprises two or more compressor portions that are drivingly interconnected with a corresponding number of turbine portions in the gas expansion section. An appropriate number of hollow coaxial shafts extend along the longitudinal axis of the engine interconnecting the compressor and turbine portions.

In operation, air entering the compression section is progressively compressed thereby before being mixed with fuel and the mixture combusted in the combustion section. The resultant hot gases then expand through, and thereby drive, the turbine portions of the expansion section.

Conventionally, the shaft or shafts interconnecting the compressor and turbine portions are supported by rolling element bearings that are strategically positioned along the lengths of the shafts. The bearings are designed to carry the radial and axial loads expected to be imposed upon them and are lubricated by a fluid lubricant, usually an appropriate oil. The lubricant flows between the various engine bearings and storage reservoirs through passages located within and around the engine. This obviously presents difficulties if the lubricant is required to flow through areas of the engine (such as the turbine portions) that operate at high temperature. Thus the lubricant is rendered vulnerable to thermal degradation or even combustion. Thermal degradation can lead to the formation of particulate material within the lubricant. This is clearly undesirable in view of the filter blockage that can result and the prejudicial effect that it can have on the bearings.

One way in which the problem of lubricant thermal degradation could be addressed is by increasing the lubricant flow rate. However, this requires the use of more powerful pumps and the increased pressure of the liquid lubricant could give rise to cold combustion of the lubricant, bringing about in turn carbon formation and filter blockage.

It has been proposed, in for instance EP0816654, to support a gas turbine engine shaft by electromagnetic bearings. This is clearly desirable in terms of the elimination of lubricant. However, such use of electromagnetic bearings can add complexity to an engine. Moreover, some bearings within gas turbine engines can be subject to very high and variable loading. This would in many cases dictate the use of electromagnetic bearings of impractical size and power consumption. Moreover, electromagnetic bearings in some applications within a gas turbine engine would, as result of varying loads and other parameters, present difficulties in the maintenance of appropriate engine running clearances.

SUMMARY OF THE INVENTION

It is an object of the present invention to provide a gas turbine engine having a bearing system that substantially avoids the aforementioned difficulties.

According to the present invention, a gas turbine engine comprises at least one shaft having an axis of rotation providing a driving interconnection between two portions of said engine, said at least one shaft being primarily supported from the remainder of said engine during normal engine operation by at least one rolling element bearing and at least one electromagnetic bearing, said bearings being axially spaced apart from each other so that said at least one electromagnetic bearing is or are positioned in a portion of said engine that is operationally at a higher temperature than the portion of said engine in which said at least one rolling element bearing is or are positioned.

Said portions of said engine are preferably a compressor portion and a turbine portion, said at least one electromagnetic bearing being situated in said turbine portion.

Preferably said at least one electromagnetic bearing is or are actively controlled.

Preferably said at least one electromagnetic bearing is or are journal bearings.

Said at least one shaft may drive an electrical generator, said electrical generator constituting the primary source of electrical power for said at least one electromagnetic bearing.

Said at least one rolling element bearing may be lubricated by a liquid lubricant.

Said at least one electromagnetic bearing may be gas or liquid cooled.

Said gas turbine engine may be a ducted fan gas turbine engine having at least two shafts, each of said shafts being primarily supported from the remainder of said engine by at least one rolling element bearing and at least one electromagnetic bearing, said electromagnetic bearings being situated in the turbine section of said engine.

BRIEF DESCRIPTION OF THE DRAWINGS

The present invention will now be described, by way of example, with reference to the accompanying drawings in which.

DETAILED DESCRIPTION OF THE INVENTION

Figure 1:
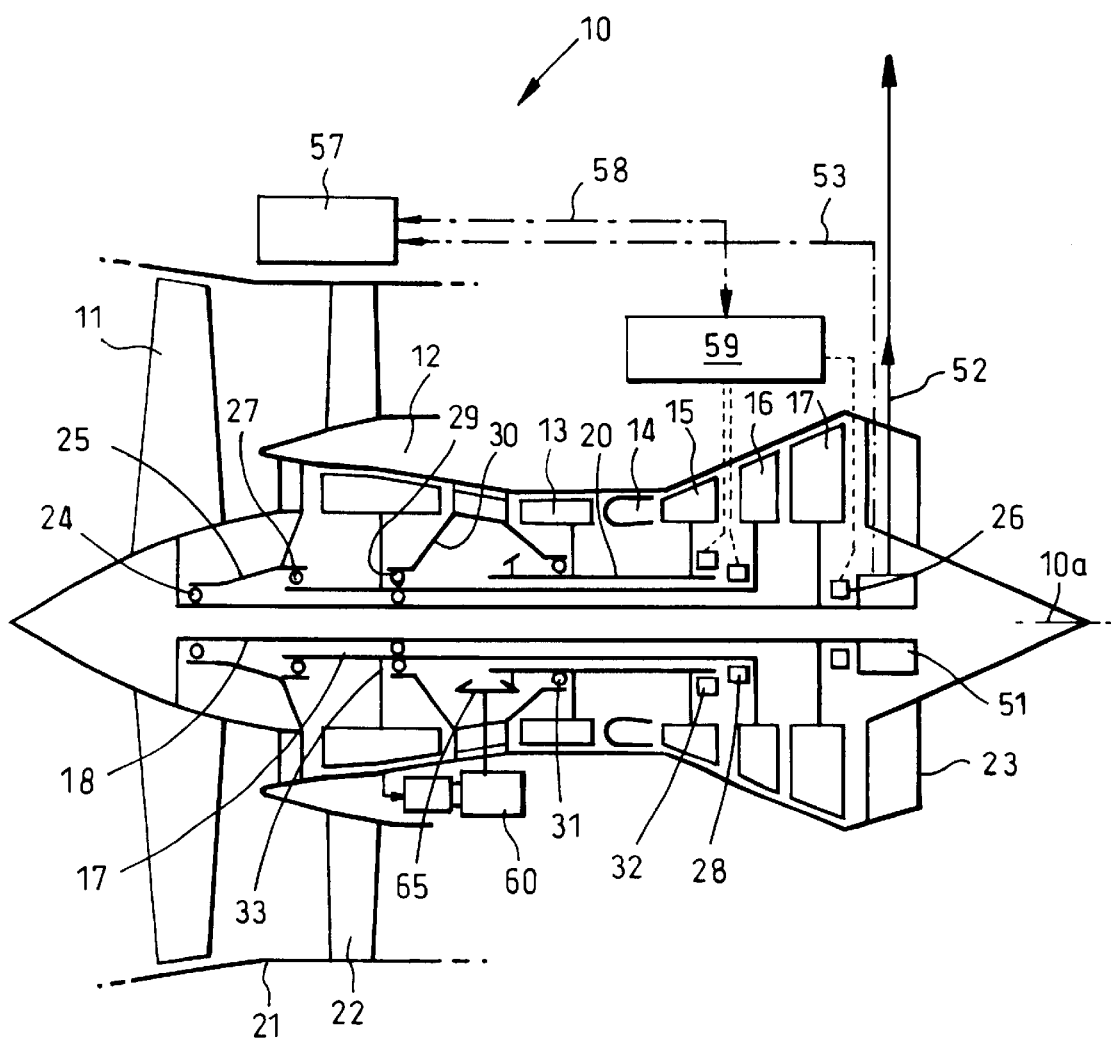
FIG. 1 is a schematic side view of a ducted fan gas turbine engine in accordance with the present invention.

With reference to FIG. 1, a ducted fan gas turbine engine generally indicated at 10 is of conventional configuration. It comprises, in axial flow series, a propulsive fan 11, intermediate and high pressure compressors 12 and 13 respectively, combustion equipment 14 and high, intermediate and low pressure turbines 15, 16 and 17 respectively. Three concentric shafts 18, 19 and 20 provide driving interconnection between the various compressors and turbines. Specifically, a first shaft 18 interconnects the fan 11 and the low pressure turbine 17, a second shaft 19 interconnects the intermediate pressure compressor 12 and the intermediate pressure turbine 16, and a third shaft 20 interconnects the high pressure compressor 13 and the high pressure turbine 15.

The gas turbine engine 10 functions in the conventional manner whereby ambient air is accelerated by the fan 11 and divided into two concentric flows. The first, radially outer, flow passes through a casing 21 surrounding the fan blades 11 and over an annular array of outlet guide vanes 22 to be exhausted to atmosphere to provide propulsive thrust. The second flow is directed into the intermediate and high pressure compressors 12 and 13 which act upon the air to progressively increase its pressure. The compressed air is then mixed with fuel in the combustion equipment 14 and the mixture combusted. The resultant hot combustion products expand through, and thereby drive, the high, intermediate and low pressure turbines 15, 16 and 17 before being exhausted to atmosphere through a propulsion nozzle 23 located at the downstream end of the engine 10 to provide additional propulsive thrust.

The first shaft 18 interconnecting the fan 11 and the low pressure turbine 17 is supported for rotation on bearings positioned in the region of each of its axial extents. The bearing 24 at the upstream end of the shaft 18 is of the conventional rolling element type and supports the shaft 18 from fixed engine structure 25. However, downstream end of the shaft 18 is supported by a first active electromagnetic bearing 26.

Similarly, the second shaft 19 is supported for rotation at its upstream end from the engine fixed structure 25 by a rolling element bearing 27. Its downstream end is supported by a second active electromagnetic bearing 28. Further support for the second shaft 19 is provided by a rolling element bearing 29 that is carried by further fixed engine structure 30 and is positioned part-way along the second shaft 19.

Finally, the third shaft 20 is supported for rotation at its upstream end from the further fixed engine structure 30 by a rolling element bearing 31. Its downstream end is supported by a third active electromagnetic bearing 32.

All of the active electromagnetic bearings 26, 28 and 32 are journal bearings and are supported from fixed engine structure which, in the interests of clarity, is not shown.

An intershaft rolling element bearing 33 is positioned between the first and second shafts 18 and 19, radially inwardly of the bearing 29.

Although in this particular case the engine 10 is of the three shaft type, it will be appreciated that the present invention could be applicable to gas turbine engines of the twin shaft type or even engines having a single shaft.

Essentially, the rolling element bearings 24, 27, 29, 31 and 33 are all of conventional configuration and are located within the engine 10 in the conventional manner. Consequently further details of their configuration and installation will not be given since such information will be well known to those skilled in the art.

Figure 2:
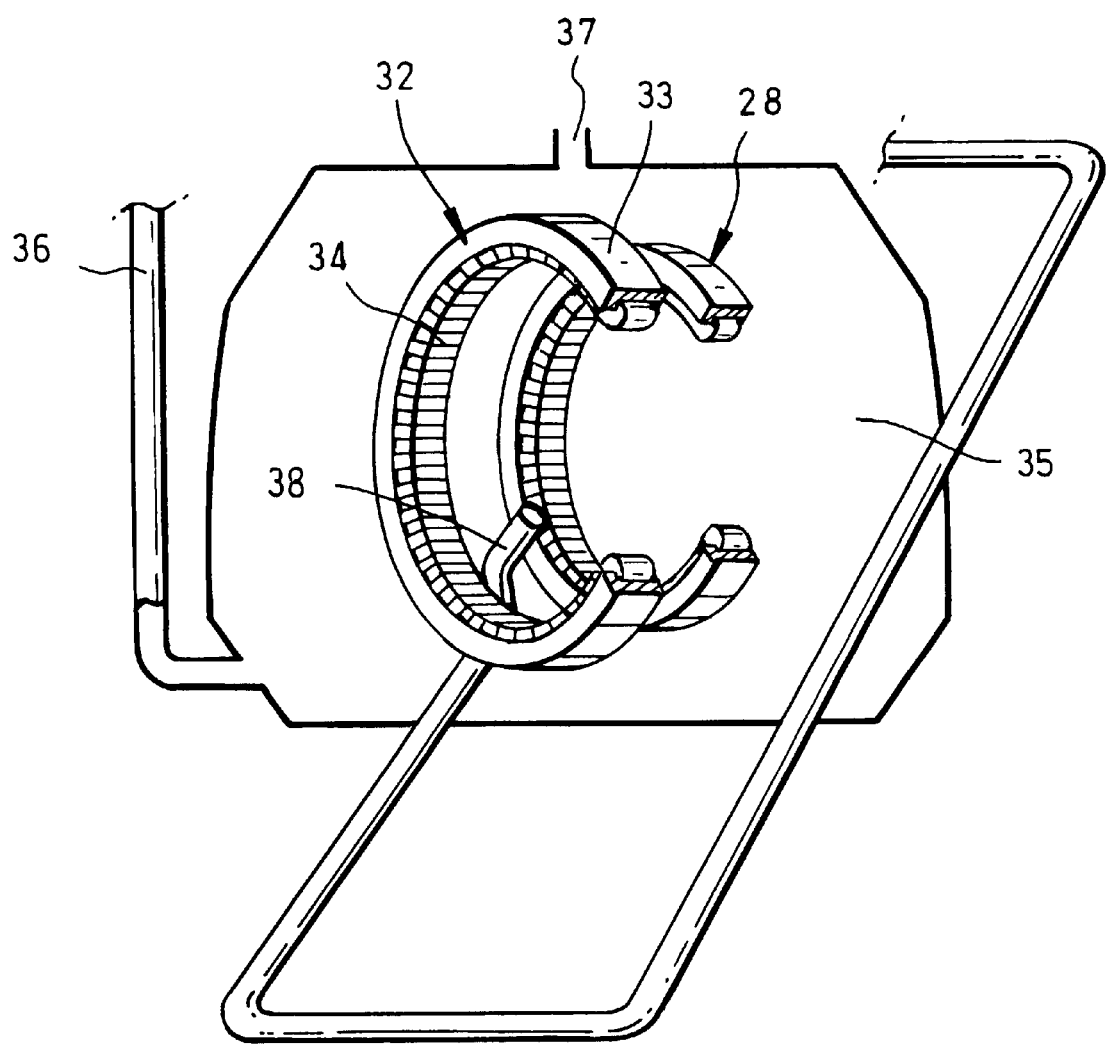
FIG. 2 is a partially broken away view of two active electromagnetic bearings of the gas turbine engine shown in FIG. 1.

The electromagnetic bearings 26, 28 and 32 are of generally conventional configuration. The second and third electromagnetic bearings 28 and 32 can be seen in more detail if reference is now made to FIG. 2. Essentially, each stator portion of the electromagnetic bearings 26, 28 and 32 is in the form of a ring 33 that carries an annular array of electromagnetic coils 34 on its radially inner surface. The coils 34, when activated, create a magnetic field that serves to support the shaft surrounded by the ring 33.

The coils 34, when activated, generate heat. In order to ensure that this heat is dissipated as effectively as possible, the electromagnetic bearings 28 and 32 are contained within a chamber 35 to which cooling air derived from a convenient source (such as one of the engine's compressors) is directed. The cooling air is delivered to the chamber 35 through a pipe 36 and exhausted from the chamber 35 through an outlet orifice 37. It will be appreciated that other forms of gas cooling could be employed if so desired and indeed it may be desirable in certain circumstances to employ liquid cooling.

As mentioned earlier, the electromagnetic bearings 26, 28 and 32 are actively controlled. This is to ensure that the shafts 18, 19 and 20 are maintained as closely as possible to a coaxial relationship with the longitudinal axis 10a of the engine 10. Additionally, the electromagnetic bearings 26, 28 and 32 are controlled in such a way that any vibration in the shafts 18, 19 and 20 is substantially eliminated.

Active control of the electromagnetic bearings 26, 28 and 32 is achieved by monitoring the distance between each shaft and its corresponding electromagnetic bearing. To facilitate this, each electromagnetic bearing is associated with a plurality of sensors, one of which 38 can be seen in FIG. 2, that provide output signals representative of the distance between each shaft and its corresponding electromagnetic bearing. If reference is now made to FIG. 3, which shows the third electromagnetic bearing 32, the active control mechanism can be seen in more detail. It will be appreciated however that the remaining first and second electromagnetic bearings 26 and 28 are of similar configuration.

Figure 3:
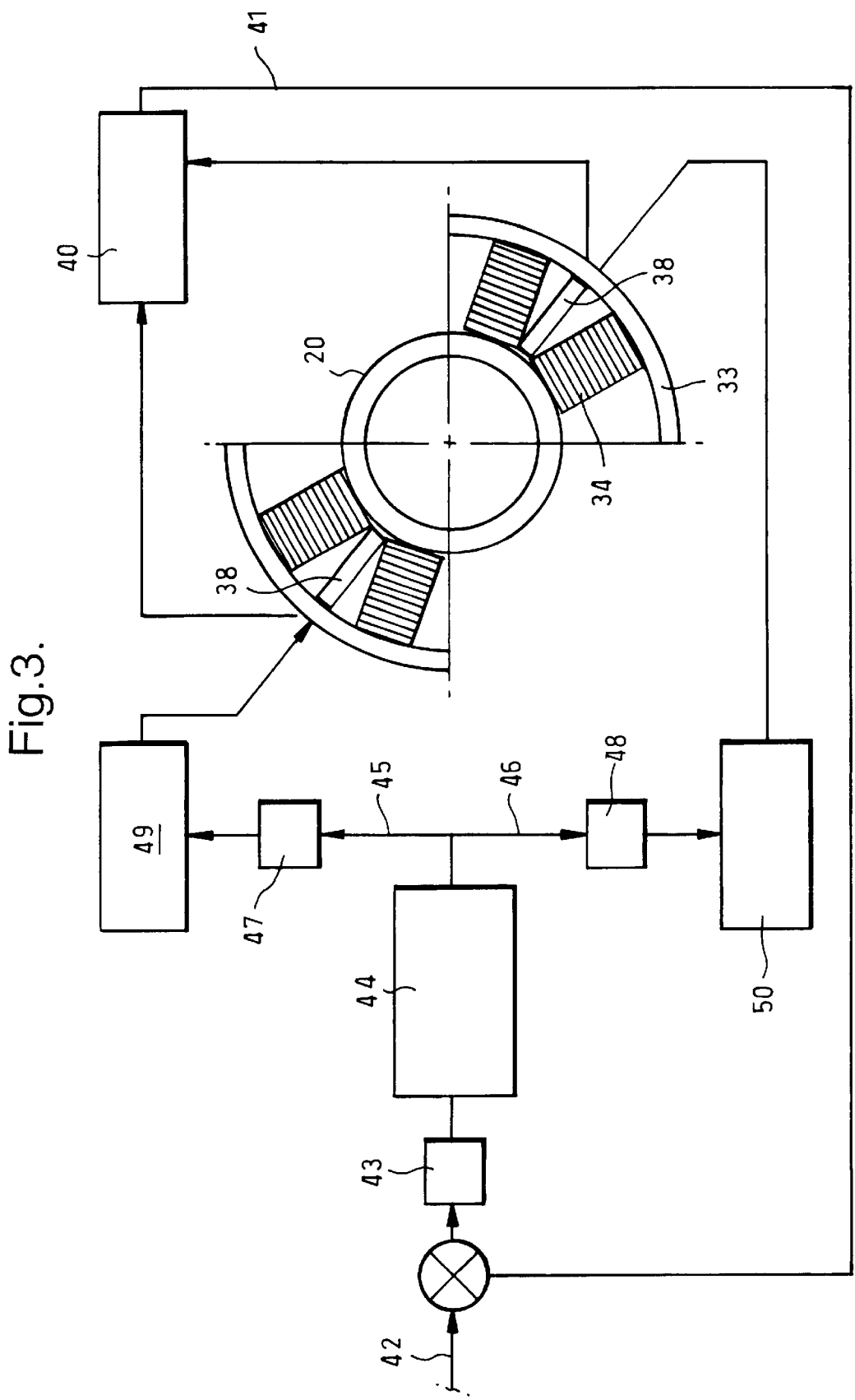
FIG. 3 is a schematic view of an active electromagnetic bearing used in the ducted fan gas turbine engine shown in FIG. 1

The electromagnetic bearing 32 is surrounded by a plurality of the coils 34 carried, as mentioned previously, by the ring 33. In FIG. 3, only four coils 34 are shown, but it will be appreciated that as mentioned earlier, there is an annular array of such coils 34. Similarly, although only two sensors 38 are shown, there are in fact more than this.

The signals from a pair of diametrically opposed sensors 38 are fed to a device 40 that determines the difference between the signals and provides an output signal 41 proportional to that difference. The sensor difference output signal 41 is combined with a reference signal 42, whereupon the combined signal is acted upon by an analog to digital converter 43. The resultant digital signal is then acted upon by a control device 44 which determines the nature of the magnetic field necessary to maintain the shaft 20 coaxial with the engine axis 10a. The output of the control device 44 is divided into two signals 45 and 46 that are acted upon by two digital to analog converters 47 and 48. The resultant analog signals are acted upon by two power amplifiers 49 and 50 before being directed to activate the coils 34 in a manner consistent with the maintenance of a coaxial relationship between the shaft 20 and engine axis 10a. The coils 34 and sensors 38 may also be activated in such a manner, as mentioned earlier, as to reduce or substantially eliminate vibration in the shaft 20.

Referring back to FIG. 1, the first shaft 18 interconnecting the fan 11 and the low pressure turbine 17 is provided with an electrical generator 51 at its downstream end. The generator 51, which may be of any convenient type, generates electrical power upon the rotation of the first shaft 18. The generated electrical power provides two outputs 52 and 53. The first output 52 is directed to provide electrical power for the aircraft which in use carries the engine 10.

The remaining electrical output 53 from the generator 51 is directed to the main electronic control unit 57 for the engine 10 and constitutes the power source for that unit 57. The control unit 57 in turn supplies an appropriate level of electrical power via a line 58 to the control unit 59 of the electromagnetic bearings 26, 28 and 32. Thus the control unit 59 incorporates the circuitry shown in FIG. 3 and other, similar, circuitry. The main electronic control unit 57 does, of course, also control the operation of many of the remaining variable features of the engine 10.

Although the generator 51 is the primary source of power for the electromagnetic bearings 26, 28 and 32, it will be appreciated that in certain situations, such as during engine starting or during maintenance when the engine 10 is not running, insufficient power will be generated to activate the bearings. Under such circumstances, it will be necessary to derive electrical power from an alternative source, such as a battery, auxiliary power unit or other suitable power source.

It will be seen, therefore, that the electromagnetic bearings 26, 28 and 32 are all located within the hot turbine section of the engine 10. Since these bearings do not require an externally supplied liquid lubricant in order to function, problems usually associated with the provision of liquid lubricant passages within a hot engine area are avoided. Thus the problems of thermal degradation of lubricating oil and the resultant coking and lacquering problems that this can give rise to are avoided. Moreover, since the constraints of a liquid lubricated system are avoided, it is possible to contemplate increasing the operating temperatures within the turbine. This in turn gives rise to the possibility of increased thermal efficiency of the engine 10.

Since the overall liquid lubricant demand of the engine 10 is reduced compared with a conventional engine and the areas requiring liquid lubrication are confined to the cooler regions of the engine, the liquid lubrication system may be simplified, thereby reducing costs and weight. Moreover, since the rolling element bearings 24, 27, 29, 31 and 33 are located close to the air driven starter 60 used for starting the engine 10, they could utilize a liquid lubricant system shared with that starter 60. The starter 60 is mechanically interconnected with the third shaft 20 in the conventional manner via a bevel gear arrangement 65 in order to facilitate engine starting.

Although the present invention has been described with reference to a three shaft ducted fan gas, turbine engine, it will be appreciated that it could also be utilized in a gas turbine engine having two shafts or even one.

Moreover, although the present invention has been described with specific reference to a gas turbine engine for use in powering an aircraft, it will be appreciated that it is also applicable to gas turbine engines used for other purposes. Thus, for instance the present invention may be applicable to gas turbine engines used in land-based power generation units or those used for marine purposes.

We claim:

1. A gas turbine engine comprising at least one shaft having an axis of rotation providing a driving interconnection between two portions of said engine, said at least one shaft being primarily supported from the remainder of said engine during normal engine operation by a rolling element bearing and at least one electromagnetic bearing, said bearings being axially spaced apart from each other so that said at least one electromagnetic bearing is positioned in a portion of said engine that is operationally at a higher temperature than the portion of said engine in which said at least one rolling element bearing is positioned, said portion of said engine that is, in operation, at a higher temperature being free of any rolling element bearing and the other of said portions in which said at least one rolling element bearing is positioned being free of any electromagnetic bearing.

2. A gas turbine engine as claimed in claim 1 wherein said portions of said engine are a compressor portion and a turbine portion, said at least one electromagnetic bearing being situated in said turbine portion.

3. A gas turbine engine as claimed in claim 1 wherein said at least one electromagnetic bearing is or are journal bearings.

4. A gas turbine engine as claimed in claim 1 wherein said at least one shaft drives an electrical generator, said electrical generator constituting the primary source of electrical power for said at least one electromagnetic bearing.

5. A gas turbine engine as claimed in claim 1 wherein said at least one rolling element bearing is or are lubricated by a liquid lubricant.

6. A gas turbine engine as claimed in claim 1 wherein said at least one electromagnetic bearing is or are gas or liquid cooled.

7. A gas turbine engine as claimed in claim 1 wherein said gas turbine engine is a ducted fan gas turbine engine having at least two shafts, each of said shafts being primarily supported from the remainder of said engine by at least one rolling element bearing and at least one electromagnetic bearing, said electromagnetic bearings being situated in the turbine section of said engine.

8. A gas turbine ending as claimed in claim 1 wherein a control unit is provided to control the supply of electrical power to said at least one electromagnetic bearing.

* * * * *